(12) United States Patent
Coughlin et al.

(10) Patent No.: US 6,875,942 B2
(45) Date of Patent: Apr. 5, 2005

(54) METHODS AND SYSTEMS FOR FABRICATING SPIRAL WELDED CYLINDERS

(75) Inventors: Stephen A. Coughlin, Ballwin, MO (US); Warner G. Fencl, St. Peters, MO (US); Robert Shaner, Rector, AR (US); Michael R. Williams, Creve Coeur, MO (US)

(73) Assignee: American Railcar Industries, Inc., St. Charles, MO (US)

( * ) Notice: Subject to any disclaimer, the term of this patent is extended or adjusted under 35 U.S.C. 154(b) by 0 days.

(21) Appl. No.: 10/754,794

(22) Filed: Jan. 9, 2004

(65) Prior Publication Data

US 2004/0140340 A1 Jul. 22, 2004

Related U.S. Application Data

(62) Division of application No. 10/034,154, filed on Dec. 27, 2001, now Pat. No. 6,717,093.
(60) Provisional application No. 60/258,395, filed on Dec. 27, 2000.
(51) Int. Cl.[7] .............................................. B21D 39/00
(52) U.S. Cl. ........................ 219/62; 228/146; 228/160; 228/17.7
(58) Field of Search .................... 219/62; 228/145–147, 228/17.5, 17.7, 159–161; 105/358, 248

(56) References Cited

U.S. PATENT DOCUMENTS

| | | | |
|---|---|---|---|
| 3,030,488 A | 4/1962 | Kuckens | |
| 3,159,911 A | * 12/1964 | Albert et al. | 228/151 |
| 3,267,570 A | 8/1966 | Winkler | |
| 3,282,228 A | * 11/1966 | Spees | 105/358 |
| 3,374,528 A | * 3/1968 | Bowcutt et al. | 228/173.6 |
| 3,475,809 A | * 11/1969 | Brown | 29/412 |
| 3,479,724 A | * 11/1969 | Graves et al. | 228/184 |
| 3,487,532 A | * 1/1970 | Phillips | 29/415 |
| 3,540,115 A | * 11/1970 | Randolph et al. | 29/421.1 |
| 3,547,047 A | * 12/1970 | Needham | 105/358 |
| 3,710,066 A | 1/1973 | Raichuk et al. | |
| 3,731,041 A | 5/1973 | Gebauer | |
| RE32,189 E | * 6/1986 | Adler et al. | 105/377.07 |
| 4,664,307 A | 5/1987 | Curry et al. | |
| 5,180,095 A | 1/1993 | Orth | |
| 5,468,117 A | * 11/1995 | Lobko et al. | 414/809 |

* cited by examiner

*Primary Examiner*—Kiley S. Stoner
*Assistant Examiner*—Kevin McHenry
(74) *Attorney, Agent, or Firm*—Armstrong Teasdale LLP

(57) ABSTRACT

A method for forming a cylindrical body utilizing a continuous weld is provided. The method includes feeding a source material including a first edge and a second edge from a coil and offsetting at least one of the first edge and the second edge. The method further includes spiraling the material to form a cylinder, welding the first edge and the second edge together forming a continuous weld, and cutting the cylinder to a selected length. To fabricate a jacket, a longitudinal cut is made in the cylindrical body, at least one cutout is cut, and the continuous weld is an outer fillet weld.

6 Claims, 5 Drawing Sheets

METHODS AND SYSTEMS FOR FABRICATING SPIRAL WELDED CYLINDERS

CROSS REFERENCE TO RELATED APPLICATIONS

This application claims the benefit of U.S. provisional application No. 60/258,395 filed Dec. 27, 2000 and is a divisional of U.S. application Ser. No. 10/034,154, filed Dec. 27, 2001, now U.S. Pat. No. 6,717,093 which is hereby incorporated by reference.

BACKGROUND OF THE INVENTION

This invention relates generally to railroad cars and, more particularly, to jackets for tank cars and roofs for hopper cars.

Rail car fabrication is a labor intensive process and generally requires numerous weld operations. While at least some welding processes are now automated, e.g., for welding sheets, even automated welding processes require proper set-up of numerous sheets of steel and experienced operators to ensure high quality welds are made by the automated equipment.

Components for rail cars such as tank cars and hopper cars are fabricated by welding steel plates together into a desired configuration. For example, some tank cars require insulation on an outer surface of the tank, and an outer jacket is utilized to contain and protect the insulation. The outer jacket typically is fabricated by welding numerous steel plates together. Although the actual welding is performed by automated machinery, the set-up operations are labor intensive. In addition, experienced welders typically must closely supervise the automated weld process to ensure proper welding.

Similarly, for a hopper car, the hopper car roof is formed by welding a plurality of steel plates together. The sides are then welded to a car cylindrical body, and the roof is located over the sides and welded thereto. Again, the extensive welding required to form the hopper car roof is time consuming and labor intensive.

BRIEF DESCRIPTION OF THE INVENTION

Methods and systems for fabricating spiral welded cylinders that are particularly well suited for rail car components are described herein. In an exemplary embodiment, a method for fabricating a cylindrical body utilizing a continuous weld includes the steps of feeding a source material including a first edge and a second edge from a coil and straightening at least a portion of the source material. The first edge is offset and the material is fed into a spiral mill so that the material forms a cylinder, or a cylindrical body. The material second edge is positioned adjacent the first edge, and a continuous weld at the interface maintains the material in the formed cylinder. The weld is sometimes referred to herein as a spiral weld because the continuous weld extends along the cylinder in a spiral path.

To fabricate a jacket for a tank car, for example, a longitudinal cut is made in the cylindrical body so that the cut ends can be spread apart. Additionally, a plurality of jackets can be fabricated from a single cylindrical body by making a plurality of longitudinal cuts. The body, or jacket, is then positioned over and secured to the tank. To fabricate a roof for a hopper car, two longitudinal cuts are made to the cylindrical body at select location to provide an arc shaped roof. The roof is then secured to side walls of the hopper car.

DETAILED DESCRIPTION OF THE INVENTION

Figure 1:
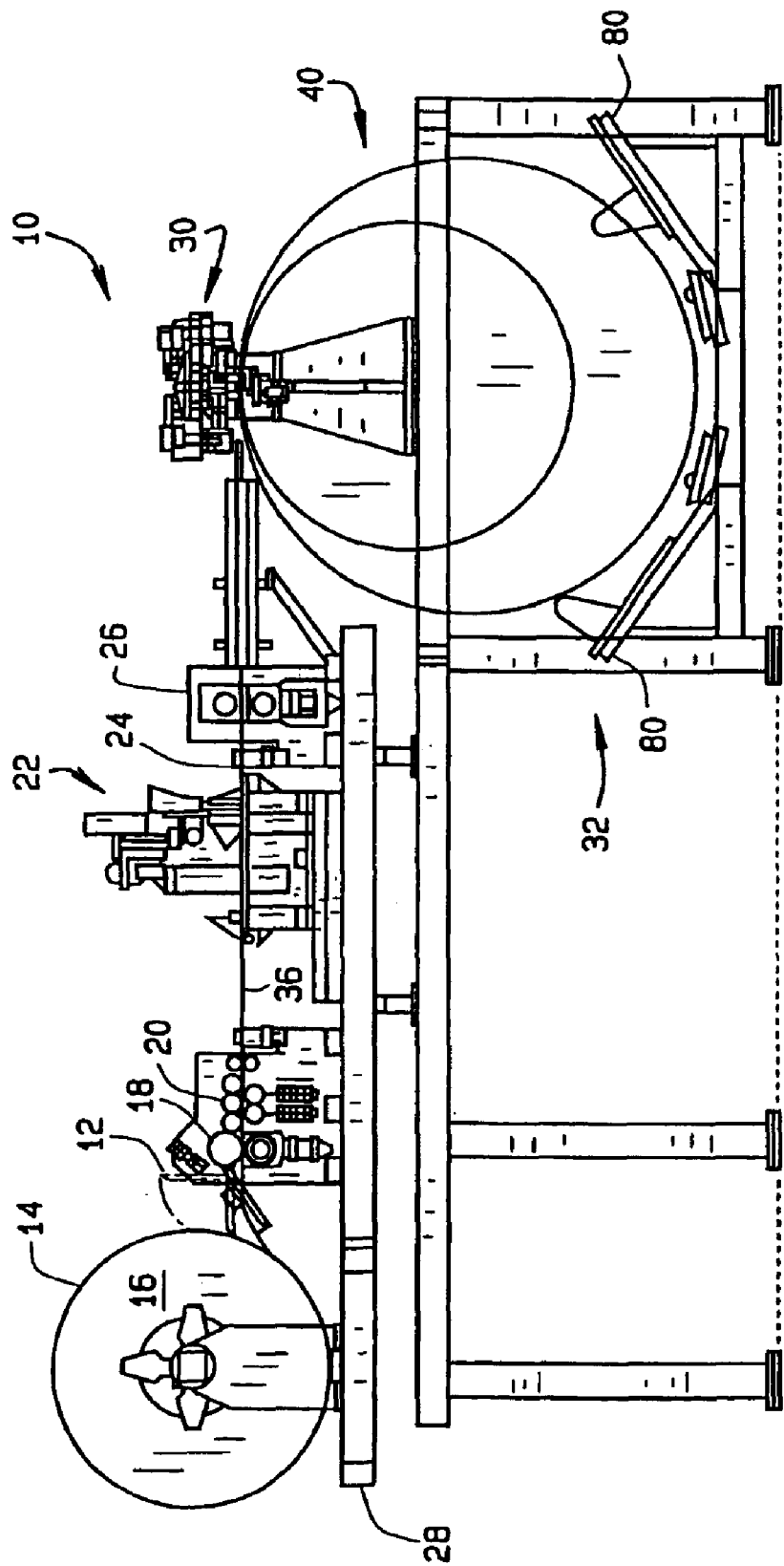
FIG. 1 is a side plan view of a system for forming a cylindrical body using a continuous weld.
Figure 2:
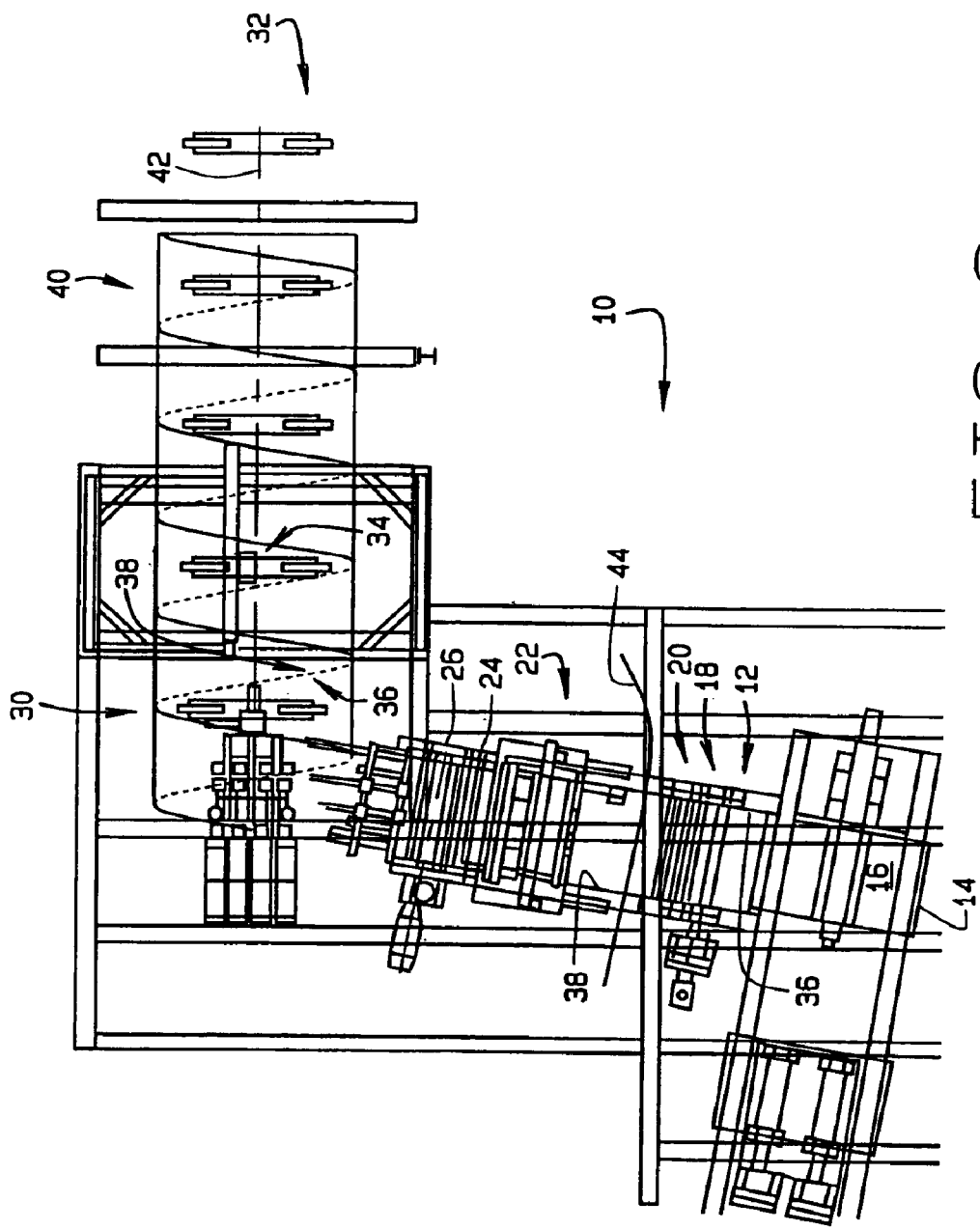
FIG. 2 is a top plan view of the system shown in FIG. 1.

FIG. 1 is a side plan view and FIG. 2 is a top plan view of a system 10 for forming a cylindrical body using a continuous weld. System 10 includes a peeler 12 in series configuration with a coil 14 of a metal source material 16. Peeler 12 prevents coil 14 from freely unwrapping. System 10 further includes a first drive roller 18 in series configuration with peeler 12, a straightener 20 in series configuration with roller 18, and a splicing assembly 22 also in series configuration with roller 18. System 10 further includes an offsetter 24 in series configuration with roller 18, and a second drive roller 26 in series configuration with offsetter 24. Coil 14, peeler 12, roller 18, straightener 20, splicing assembly 22, offsetter 24, and roller 26 are mounted on a pivoting mounting surface 28. System 10 further includes a spiral welder 30 in series configuration with roller 26, a cylinder fixture 32 in series configuration with welder 30, and a cutter 34 in series configuration with fixture 32. Material 16 includes a first edge 36 and a second edge 38.

During operation of system 10, material 16 is fed through peeler 12 to first drive roller 18 and first drive roller 18 is engaged such that first drive roller 18 can drive or push material 16. First drive roller 18 pushes material 16 through straightener 20 and splicing assembly 22 to offsetter 24. Offsetter 24 offsets at least one of first edge 36 and second edge 38 before material 16 is pushed to second drive roller 26. Second drive roller 26 is engaged such that second drive roller 26 can drive or push material 16 to spiral welder 30 which welds material 16 into a cylinder 40 and cylinder fixture 32 supports and transports cylinder 40. Cutter 34 cuts cylinder 40 when a length (not shown) of cylinder 40 is at a desired length.

In an exemplary embodiment, cutter 34 is a plasma torch, such as, for example, a Hypertherm Max100 system, available from Hypertherm Inc. of Hanover N.H. In an alternative embodiment, cutter 34 is a metal cutting laser. It is contemplated that the benefits of the invention accrue to systems utilizing all methods of cutting metal, including metal cutting bandsaws and metal cutoff wheels.

In an exemplary embodiment, offsetter 24 utilizes a joggle joint die to offset at least one of first edge 36 and second edge 38. When material 16 reaches second drive roller 26, first drive roller 18 is disengaged and not utilized to push material 16 further. Additionally, straightener 20 is typically utilized only at the beginning and the ending portions (not shown) of coil 14. Accordingly, straightener 20 can be disengaged. In an exemplary embodiment, straightener 20 is a three over two straightening table that utilizes three rollers above material 16 and two rollers below material 16 and second drive roller 26 pushes material 16 to spiral welder 30 at a helix angle (not shown) from 90° to a longitudinal axis 42 of cylinder 40. The helix angle is between approximately 6.5° and approximately 13.3° to provide a diameter (not shown) of between approximately 96" and approximately 132" for cylinder 40 utilizing material 16 having a width (not shown) between approximately 48" and approximately 64". The helix angle is adjusted by pivoting surface 28 along an arc 44.

Figure 3:
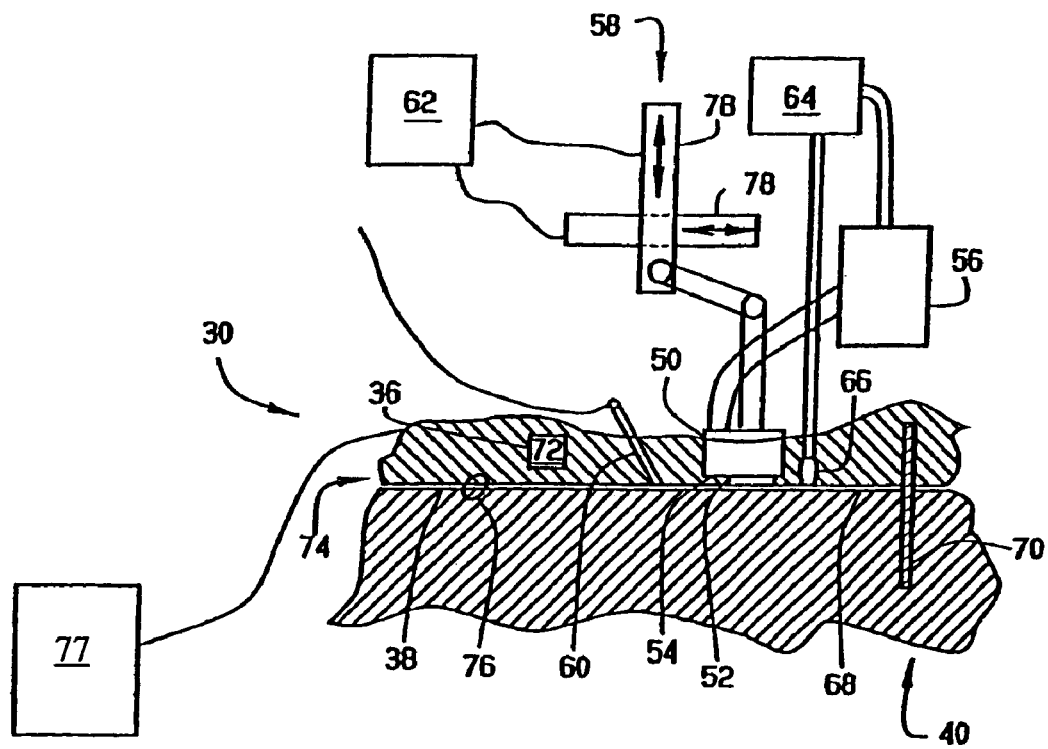
FIG. 3 is a perspective plan view of one embodiment of a spiral welder.

FIG. 3 is a perspective plan view of one embodiment of spiral welder 30 including an automatic submerged arc welder 50 including a weld head 52, a flux dispenser 54, a flux supply 56, and a movable mount 58. Spiral welder 30 further includes a seam tracker 60 in series configuration with arc welder 50. Seam tracker 60 is electrically connected to a controller 62 that controls arc welder 50. Spiral welder further includes a vacuum 64 in series configuration with arc welder 50 opposite seam tracker 60. Vacuum 64 includes a vacuum nozzle 66 to vacuum loose flux (not shown) from weld 68. A scraper 70 to scrap hardened flux (not shown) from weld 68 is in series configuration with vacuum nozzle 66. Spiral welder 30 further includes monitor 72 in series configuration with seam tracker 60. Monitor 72 monitors a width (not shown) of a gap 74 between first edge 36 and second edge 38. In addition, monitor 72 controls the helix angle such that the width of gap 74 is substantially uniform. Also, in an exemplary embodiment, a person, i.e., an operator, watches the width of gap 74 and manually actuates a gap control for swing arm 44 and makes active adjustments to the welding process.

Spiral welder 30 includes a spiral mill (not shown) that material 16 passes through. Because of the helix angle and the spiral mill, material 16 is wrapped in a helix and first edge 36 is positioned next to second edge 38 as best seen in FIG. 2. In an exemplary embodiment, the spiral mill is a spiral mill from the PRD Company of Hayward Calif. and automatic submerged arc welder 50 is an automatic submerged arc welder available from the Lincoln Electric Company of Cleveland Ohio. Seam tracker 60 is a Cyclomatic seam tracker from ITW Welding Automation of Appleton Wis. Vacuum 64 is a vacuum from the American Vacuum Company of Skokie Ill.

During operation of spiral welder 30, a portion 76 of gap 74 rotates beneath monitor 72 which monitors the width of portion 76 and transmits a signal to a motor 77 configured to pivot mounting surface 28 (shown in FIG. 1) about arc 44 (shown in FIG. 2) such that the width of gap 74 is substantially uniform. Portion 76 then rotates beneath seam tracker 60 which tracks a seam (gap 74) and transmits a weld location signal to controller 62 which positions arc welder 50 accordingly. In an exemplary embodiment, arc welder 50 is mounted with a plurality of orthogonal sliding members 78 providing a two dimensional positioning capability. Portion 76 then rotates under flux dispenser 56 which dispenses an amount of flux (not shown) such that weld head 52 is submerged in flux and weld held 52 fabricates weld 68. Portion 76 then rotates under vacuum nozzle 66 which vacuums loose flux. Portion 76 then rotates under scraper 70 which scraps hardened flux from weld 68. The hardened flux falls into a chute leading to a trash dumpster (not shown). Accordingly, cylinder 40 is fabricated until the length is at a desired length and second drive roller 26 (shown in FIG. 2) is stopped while cutter 34 (shown in FIG. 2) rotates around cylinder 40 cutting cylinder 40. In an exemplary embodiment, cylinder 40 is cut in a plane normal to cylinder 40. In an alternative embodiment, cylinder 40 is cut in a plane other than normal to cylinder 40. Accordingly, a cylindrical body is formed with a continuous weld.

After forming a plurality of bodies with continuous welds, coil 14 is exhausted of material 16. Material 16 is pulled from coil 14 until an end portion (not shown) is positioned at splicing assembly 22. A new coil (not shown) of material 16 replaces coil 14 and a beginning end (not shown) is fed through peeler 12 to first drive roller 18 and first drive roller 18 is engaged such that first drive roller 18 can drive or push the beginning end through straightener 20 to splicing assembly 22. The beginning end is then joined to the end portion providing a continuous source of material 16. In an exemplary embodiment, splicing assembly 22 includes a plasma torch (not shown) and a clamp welder (not shown). The plasma torch is utilized to trim the beginning end and the end portion. The trimmed beginning end is butted against the trimmed end portion and both are clamped down and welded together. Accordingly, a continuous source of material 16 is provided.

In an exemplary embodiment, material 16 is flexible gauge 11 steel, such as, for example, American Society for Testing and Materials (ASTM) A607 grade 50, ASTM A569 grade 50, ASTM A36, and ASTM A570 grade 50. Accordingly, cylinder 40 is deformable under its own weight and fixture 32 (shown in FIG. 1) includes a plurality of side supports 80 to limit the deformation of cylinder 40 while supported in fixture 32.

Figure 4:
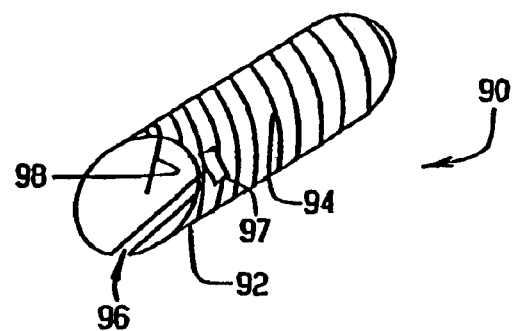
FIG. 4 is a perspective top view of a jacket for a tank car.

FIG. 4 is a perspective top view of a jacket 90 for a tank car (not shown). Jacket 90 is fabricated by making a cylindrical body 92 with a continuous weld 94, as explained above, and cutting a longitudinal cut 96 and at least one cutout 97 in cylindrical body 92. In an exemplary embodiment, continuous weld 94 is an outer fillet weld and an automated plasma torch (not shown) traverses a longitudinal path underneath cylindrical body 92 cutting longitudinal cut 96. Longitudinal cut 96 allows a radius 98 to be increased, as explained below, to facilitate applying jacket 90 to the tank car. In an exemplary embodiment, an interior surface (not shown) is painted except for an approximately three foot wide longitudinal strip in a bottom portion (not shown) of cylindrical body 92.

Figure 5:
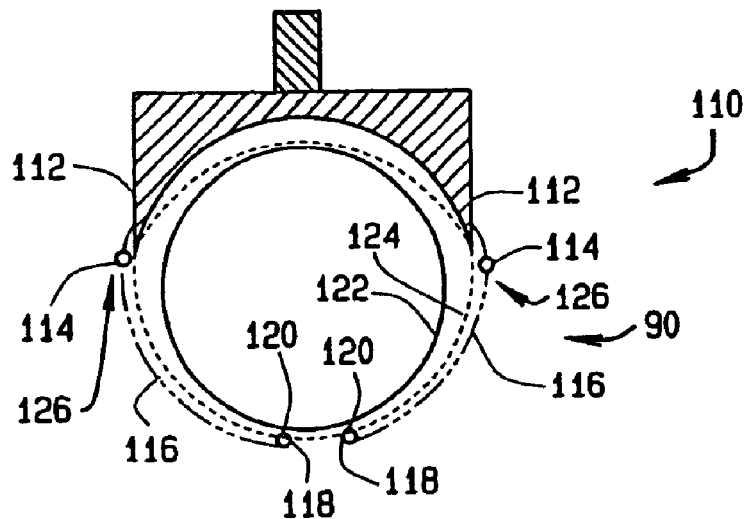
FIG. 5 is a front view of the jacket shown in FIG. 4.

FIG. 5 is a front view of jacket 90 lifted in an anti-overspread beam 110 including a plurality of restricting arms 112. Anti-overspread beam 110 further includes a plurality of chain mounts 114 for mounting a plurality of chains 116 including chain hooks 118 that hook on a plurality of edges 120 of jacket 90.

During operation, two beams 110 are positioned over jacket 90 and chain hooks 118 are attached to edges 120, beams 110 are placed one at each end (not shown) of jacket 90. When beams 110 are raised, hooks 118 apply a force to edges 120 that causes radius 98 to distort from a normal state 122 to an enlarged state 124. Restricting arms 112 contact jacket 90 in enlarged state 124 at contact points 126 preventing jacket 90 from inverting to an inside out state (not shown). Enlarged state 126 has a radius 98 greater than a radius (not shown) of the tank car including a layer of insulation (not shown).

An angle (head angle) is applied to a head (not shown) of the tank car to align jacket 90 with a first half (not shown) of the tank car and then jacket is positioned on the first half. Beams 110 are lowered allowing jacket 90 to return to normal state 122 and hooks 118 are removed from edges 120. Accordingly, edges 120 are free to wrap around the tank car. After jacket 90 is applied to the tank car, jacket 90 is tightened around the tank car and a second jacket (not shown) is applied to a second half (not shown) of the tank car similarly. In an exemplary embodiment, second jacket overlaps jacket 90. After the second jacket is tightened around the tank car, jacket 90 and the second jacket are fillet welded together and edges 120 are welded together on both jacket 90 and second jacket with an outer fillet weld. Jacket 90 and the second jacket are then welded to the tank car at a plurality of inlet nozzles (not shown), a plurality of attachment flashings (not shown), and a plurality of tank car heads (not shown). In an exemplary embodiment, jacket 90 is a jacket for a train tank car. In an alternative embodiment, jacket 90 is a jacket for a truck tank car.

Figure 6:
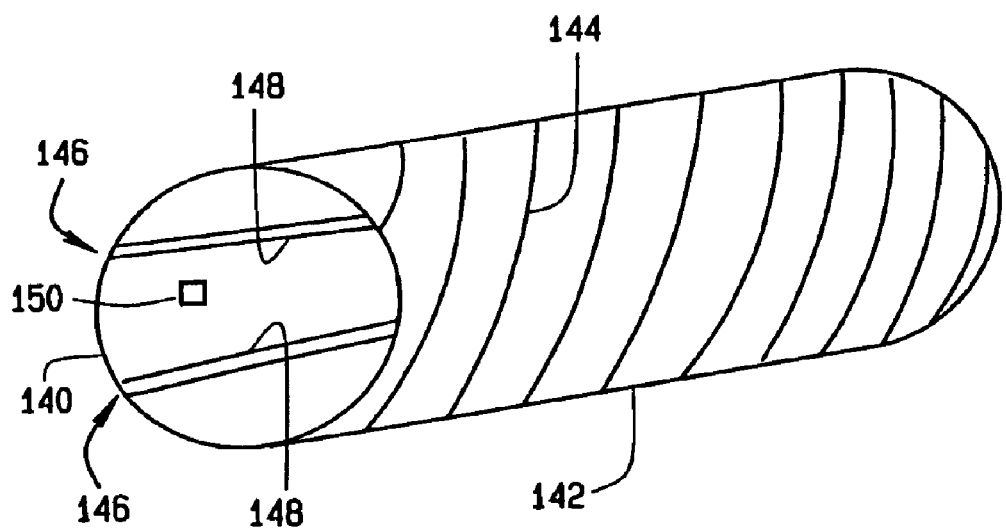
FIG. 6 is a perspective view of a spiral welded roof for a hopper car.

FIG. 6 is a perspective view of a spiral welded roof 140 for a hopper car (not shown in FIGS. 1–6). Roof 140 is fabricated by making a cylindrical body 142 with a continuous weld 144, as explained above, and cutting a plurality of longitudinal cuts 146 on both sides 148 of roof 140. In an exemplary embodiment, cylindrical body 142 has four longitudinal cuts 146 and, accordingly, four roofs 140 are fabricated from cylindrical body 142. Continuous weld 144 is an inner butt weld and an outer butt weld. Roof 140 includes at least one cutout 150 for hatch rings (not shown).

Figure 7:
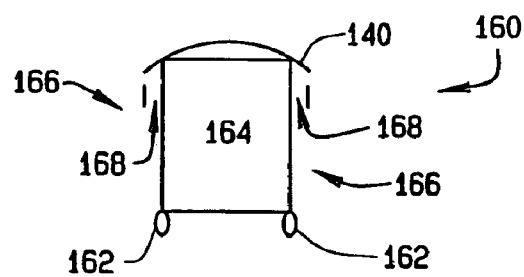
FIG. 7 is an end view of the roof shown in FIG. 6.
Figure 8:
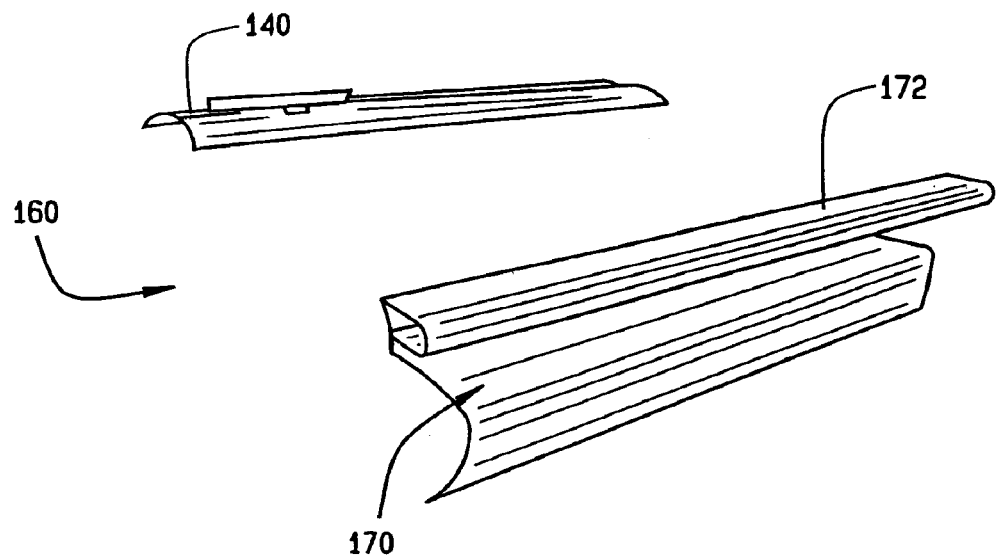
FIG. 8 is an exploded detailed view of the spiral welded roof and hopper car shown in FIGS. 6 and 7.

FIG. 7 is an end view of roof 140 attached to a hopper car 160 including a plurality of wheels 162, two bulkheads 164 (one shown in FIG. 7), and two sidewalls 166. To attach roof 140 to car 160, roof 140 is positioned over bulkheads 164 and extending over sidewalls 166 creating an extension area 168. Roof 140 is then welded to bulkheads 164 and sidewalls 166. More specifically, and referring to FIG. 8, hopper car 160 includes a side wall 170 with a top chord 172 attached at a top portion 174 of side wall 170. Roof 140 attaches to hopper car 160 via top chord 172. In other words, top chord 172 is attached to side wall 170 and then roof 140 is also attached to top chord 172. Accordingly, a roof for a hopper is fabricated from a cylindrical body using a continuous weld and the roof is attached to a hopper car.

While the invention has been described in terms of various specific embodiments, those skilled in the art will recognize that the invention can be practiced with modification within the spirit and scope of the claims.

What is claimed is:

1. A method for jacketing a tank car utilizing a first cylinder and second cylinder, each cylinder having a longitudinal cut on a bottom portion defining a first bottom edge and a second bottom edge of each cylinder, said method comprising:

lifting the first cylinder such that the first and second bottom edges of the first cylinder separate creating a radius greater than a radius of the tank car including a layer of insulation;

positioning the first cylinder over the tank car;

lowering the first cylinder such that the first and second bottom edges of the first cylinder are free to wrap around the tank car;

lifting the second cylinder such that the first and second bottom edges of the second cylinder separate creating a radius greater than a radius of the tank car including a layer of insulation;

positioning the second cylinder over the tank car;

lowering the second cylinder such that the first and second bottom edges of the second cylinder are free to wrap around the tank car;

welding the first cylinder and the second cylinder together; and welding the first and the second cylinder to at least one inlet nozzle and at least one tank car head.

2. A method according to claim 1 wherein said lifting the first cylinder further comprises lifting the first cylinder with an anti-overspread beam such that the first and the second bottom edges of the first cylinder separate creating a radius greater than a radius of the tank car, said lifting the second cylinder further comprises lifting the second cylinder with an anti-overspread beam such that the first and the second bottom edges of the second cylinder separate creating a radius greater than the radius of the tank car.

3. A method according to claim 1 further comprising:

welding the longitudinal cut on the first cylinder prior to welding the first cylinder and the second cylinder together; and welding the longitudinal cut on the second cylinder prior to welding the first cylinder and the second cylinder together.

4. A method according to claim 3 wherein said welding the longitudinal cut on the first cylinder further comprises welding the longitudinal cut on the first cylinder with an outer fillet weld prior to welding the first cylinder and the second cylinder together, said welding the longitudinal cut on the second cylinder further comprises welding the longitudinal cut on the second cylinder with an outer fillet weld prior to welding the first cylinder and the second cylinder together.

5. A method according to claim 1 wherein said positioning the first cylinder further comprises positioning the first cylinder over the tank car using a head angle, said positioning the second cylinder further comprises positioning the second cylinder the second cylinder over the tank car using a head angle.

6. A method for attaching a spiral welded roof on a hopper car including a plurality of bulkheads and a plurality of sidewalls, said method comprising the steps of:

forming a spiral welded cylinder;

cutting the spiral welded cylinder to make at least one spiral welded roof;

positioning the spiral welded roof over the bulkheads and extending over the sidewalls; and welding the spiral welded roof to the bulkheads and the sidewalls.

* * * * *

UNITED STATES PATENT AND TRADEMARK OFFICE
CERTIFICATE OF CORRECTION

PATENT NO. : 6,875,942 B2
DATED : April 5, 2005
INVENTOR(S) : Coughlin et al.

It is certified that error appears in the above-identified patent and that said Letters Patent is hereby corrected as shown below:

Column 6,
Line 42, delete "second cylinder the second cylinder over" and insert therefor -- second cylinder over --.

Signed and Sealed this

Twenty-third Day of August, 2005

JON W. DUDAS
*Director of the United States Patent and Trademark Office*